United States Patent [19]

Kurcbart

[11] Patent Number: 5,666,273

[45] Date of Patent: Sep. 9, 1997

[54] RECEPTACLE FOR PIVOTING A COMMUNICATION DEVICE

[75] Inventor: Robert Kurcbart, Boca Raton, Fla.

[73] Assignee: Motorola, Inc., Schaumburg, Ill.

[21] Appl. No.: 549,896

[22] Filed: Oct. 30, 1995

[51] Int. Cl.⁶ .................................................. H04B 1/03
[52] U.S. Cl. .................... 361/814; 340/825.44; 455/347;
361/679; 361/681; 361/683
[58] Field of Search ......................... 361/814, 679,
361/680, 681, 682, 683, 686; 455/347,
348, 349; 340/539, 825.44, 573; 235/379,
380; 206/305, 320, 592

[56] References Cited

U.S. PATENT DOCUMENTS

| | | | |
|---|---|---|---|
| 4,534,063 | 8/1985 | Krumin et al. | |
| 5,221,838 | 6/1993 | Gutman et al. | 235/379 |
| 5,398,023 | 3/1995 | Murray | 340/825.44 |
| 5,512,880 | 4/1996 | Abrams et al. | 340/573 |
| 5,537,678 | 7/1996 | King et al. | 455/348 |

*Primary Examiner*—Leo P. Picard
*Assistant Examiner*—Anthony Dinkins
*Attorney, Agent, or Firm*—Keith A. Chanroo

[57] ABSTRACT

A selective call receiver (110) and a receptacle (150) has in combination (100) a breakaway lock (120, 154), a non-breakaway hinge (124, 126), a track (116) and a slidably coupling having the breakaway lock (120, 154) and the non-breakaway hinge (124, 126) coupled with the track (116) for removing and replacing the selective call receiver (110). The breakaway lock (120, 154) has a tab (154) and a groove (120) for disengaging the selective call receiver (110) from the receptacle (150) at the breakaway lock (120, 154). The non-breakaway hinge (124, 126) forms a rotatable coupling for pivoting the selective call receiver (110). The non-breakaway hinge (124, 126) has a rail (126) and a geometric groove (124) terminating the track (116). The rail (126) and the geometric groove (124) allow the selective call receiver (110) to pivoted when the breakaway lock (120, 154) is disengaged while securing the selective call receiver (110) within the receptacle (150) when the selective call receiver (110) is pivoted and releasing it to be slidably removed when the breakaway lock (120, 154) is engaged.

11 Claims, 3 Drawing Sheets

RECEPTACLE FOR PIVOTING A COMMUNICATION DEVICE

FIELD OF THE INVENTION

This invention relates in general to receptacles, and more particularly to a receptacle for pivoting a communication device.

BACKGROUND OF THE INVENTION

Portable communication devices, for example, selective call receivers, are generally carried in carrying cases (receptacles) which usually have some fastening devices for attaching them securely to, for example, belts or articles of clothing worn by the users. Heretofore, the fastening device has been attached in a fixed relation to the carrying case with the result that the orientation of the case relative to the body of a user has been fixed by the orientation of the fastening devices on the article of clothing of the user.

An increasing number of users prefer the ease and convenience of not having to remove the communication device from its fastening location, but to be able to manipulate the control buttons to retrieve information received or to otherwise modify the operation of the communication device. When the communication device is to be used or a display is to be observed, the user frequently must remove the communication device from its fastening device or supporting receptacle. It would be desirable to have a supporting receptacle wherein the communication device can be adjusted to a position of easy visual observation and control activation without removing or detaching the communication device from the receptacle.

The present invention is directed to providing a new and improved communication device and supporting receptacle, which satisfy this need.

DESCRIPTION OF A PREFERRED EMBODIMENT

Figure 1:
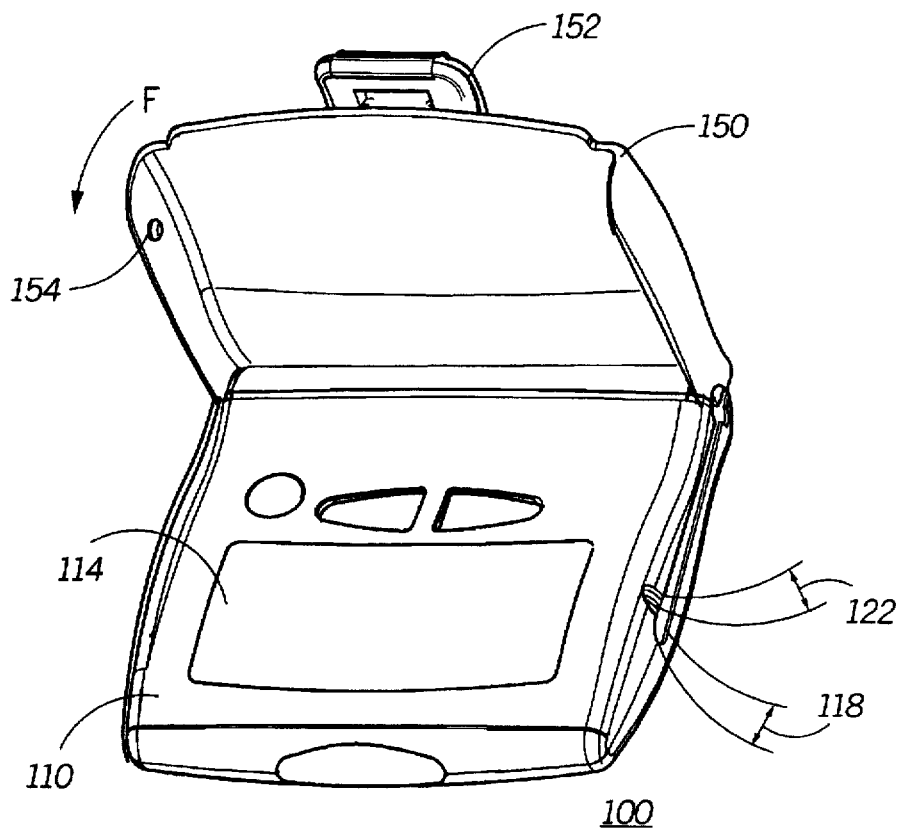
FIG. 1 is a perspective view of a receptacle for pivoting a selective call receiver in accordance with a preferred embodiment of the present invention.

Referring to FIG. 1, a perspective view of a receptacle and a communication device is shown for pivoting the communication device placed within the receptacle in accordance with a preferred embodiment of the present invention. Preferably, the communication device is a selective call receiver 110 which has a display 114. The combination 100 receptacle (or holster or fastening device) 150 and selective call receiver 110 has a clip 152 for securing the combination 100 to a user. The combination 100 comprises a breakaway lock 120, 154, a non-breakaway hinge 124, 126, a track 116 having a first depth 118 and a slidably coupling 116, 126, 154. The slidable coupling 116, 126, 154 couples the breakaway lock 120, 154 and the non-breakaway hinge 124, 126 at substantially opposite ends of the track 116 for slidably removing and slidably replacing the selective call receiver 110 from the receptacle 150. The breakaway lock 120, 154 comprises a tab 154 and a groove 120 having a second depth 122 less than the first depth 118 of the track 116 for disengaging the selective call receiver 110 from the receptacle 150 at the breakaway lock 120, 154. The groove 120 is coupled substantially perpendicular to the track 116 to permit a perpendicular force, applied to the selective call receiver 110, to disengage the selective call receiver 110 at the breakaway lock 120, 154.

The non-breakaway hinge 124, 126 forms a rotatable coupling for pivoting the selective call receiver 110 within the receptacle 150. The non-breakaway hinge 124, 126 comprises a rail 126 and a geometric groove 124 terminating the track 116. The rail 126 and the geometric groove 124 allow the selective call receiver 110 to rotate to at least one pivot position at the non-breakaway hinge 124, 126 when the breakaway lock 120, 154 is disengaged. The selective call receiver 110 is secured within the receptacle 150 by the non-breakaway hinge 124, 126 when the selective call receiver 110 is being pivoted and is released when the breakaway lock 120, 154 is engaged with the selective call receiver 110 thus permitting the selective call receiver 110 to be slidably removed from the receptacle 150. A first breakaway lock of the combination 100 is oppositely located to a second breakaway lock and a first non-breakaway hinge is oppositely located to a second non-breakaway hinge. The first breakaway lock and the first non-breakaway hinge are coupled at substantially opposite ends of a first track and the second breakaway lock and the second non-breakaway hinge are coupled at substantially opposite ends of a second track.

Specifically, the communication device 110 comprises the selective call receiver 110 and the receptacle 150. The selective call receiver 110 comprises a first track and a second track. The receptacle 150 comprises a first tab, a second tab, a first rail and a second rail. The first tab and the first rail slidably couple with the first track and the second tab and the second rail slidably couple with the second track. The first track and the second track have a first depth 118 and the first track terminates in a first geometric groove and the second track terminates in a second geometric groove. A first breakaway lock is formed with a first groove. The depth 122 of the first groove is less than the depth 118 of the first track. The first groove is coupled to the first track wherein the depth 122 of the first groove aligns and engages the first tab when the selective call receiver is fitted in the receptacle 150. The first groove permits the selective call receiver 110 to be removed and replaced for pivoting the selective call receiver at the first breakaway lock. A second breakaway lock is formed with a second groove. The depth 122 of the second groove is less than the depth 118 of the second track. The second groove is coupled to the second track wherein the depth 122 of the second groove aligns and engages the second tab when the selective call receiver is fitted in the receptacle 150. The second groove permits the selective call receiver 110 to be removed and replaced for pivoting the selective call receiver from the first breakaway lock. A first non-breakaway hinge formed with the first rail is coupled to the first geometric groove and a second non-breakaway hinge formed with the second rail is coupled to the second geometric groove. The first and second non-breakaway 124, 126 hinges enable the selective call receiver 110 to pivot when the first and second breakaway locks 120, 154 are disengaged. While the selective call receiver 110 is pivoted within the receptacle 150, the first and second non-breakaway 124, 126 hinges secure selective call receiver 110. The communication device can be slidably removed from the receptacle when the first and second breakaway locks are engaged (for example, when the communication device is not in a pivot position). The first and second grooves of the first and second breakaway locks are coupled substantially perpendicular to the first and second tracks respectively to permit a perpendicular force applied to the communication device to disengage the communication device at the first and second breakaway locks. The first breakaway lock is oppositely located to the second breakaway lock and the first non-breakaway hinge is oppositely located to the second non-breakaway hinge. The first breakaway lock and the first non-breakaway hinge are coupled at substantially opposite ends of the first track and the second breakaway lock and the second non-breakaway hinge are coupled at substantially opposite ends of the second track.

In this way, a selective call receiver is slidably and rotatably coupled with the receptacle for carrying the selective call receiver on the body of a user. When the selective call receiver is fully inserted in the receptacle, the user is able to release the selective call at the breakaway locks and pivots the selective call receiver at the non-breakaway hinge to view messages or to operate control buttons on the selective call receiver. When the selective call receiver is released from the breakaway locks, the selective call receiver can be pivoted at the non-breakaway hinge. In the pivot position, the selective call receiver is secured in the receptacle from being dislodged or removed by the user. When the selective call receiver is engaged with the breakaway locks, only then can the selective call receiver be slidably removed from the receptacle.

Figure 2:
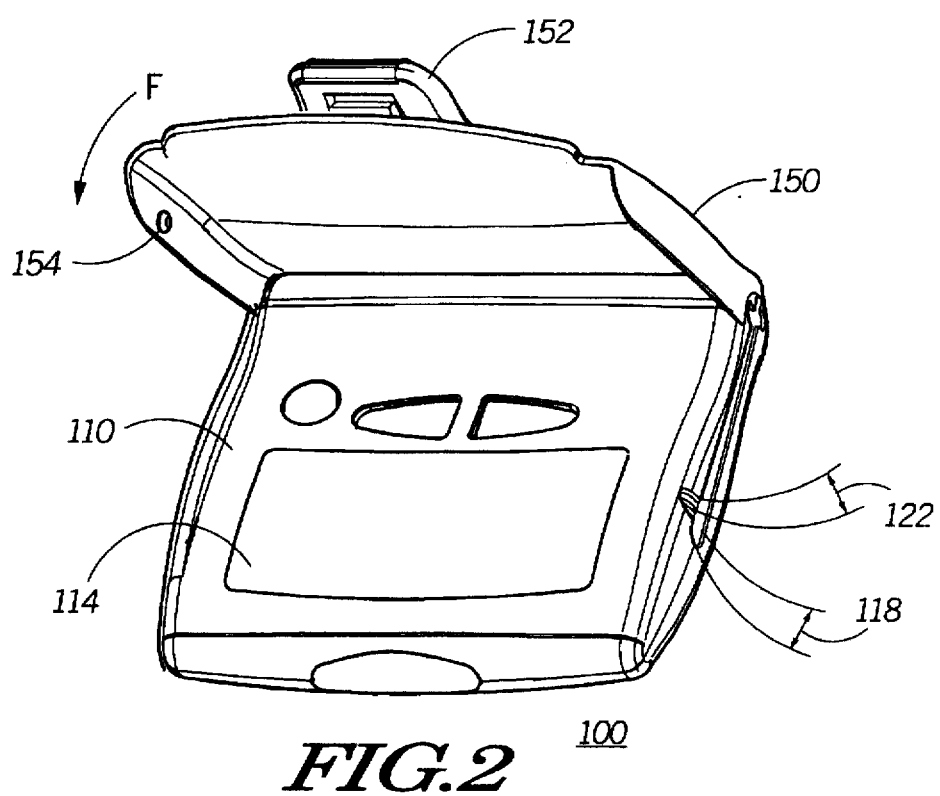
FIG. 2 is a perspective view of the receptacle and the selective call receiver in accordance with a second embodiment of the present invention.

FIG. 2 is a perspective view the receptacle for selective call receiver in another pivot position in accordance with the present invention. The combination 100 of the selective call receiver 110 and the receptacle 150 is similar to the combination discussed in FIG. 1. The geometric groove is, however designed with a first and second ridges or detents for enabling the selective call receiver 110 to pivot to a first and second position when the selective call receiver 110 is released from the breakaway lock. When the selective call receiver 110 is rotated, it will be secured in the first position as shown in FIG. 2 and when the used applies more force, the selective call receiver 110 will be released and move to the second pivot position as shown in FIG. 1.

Figure 3:
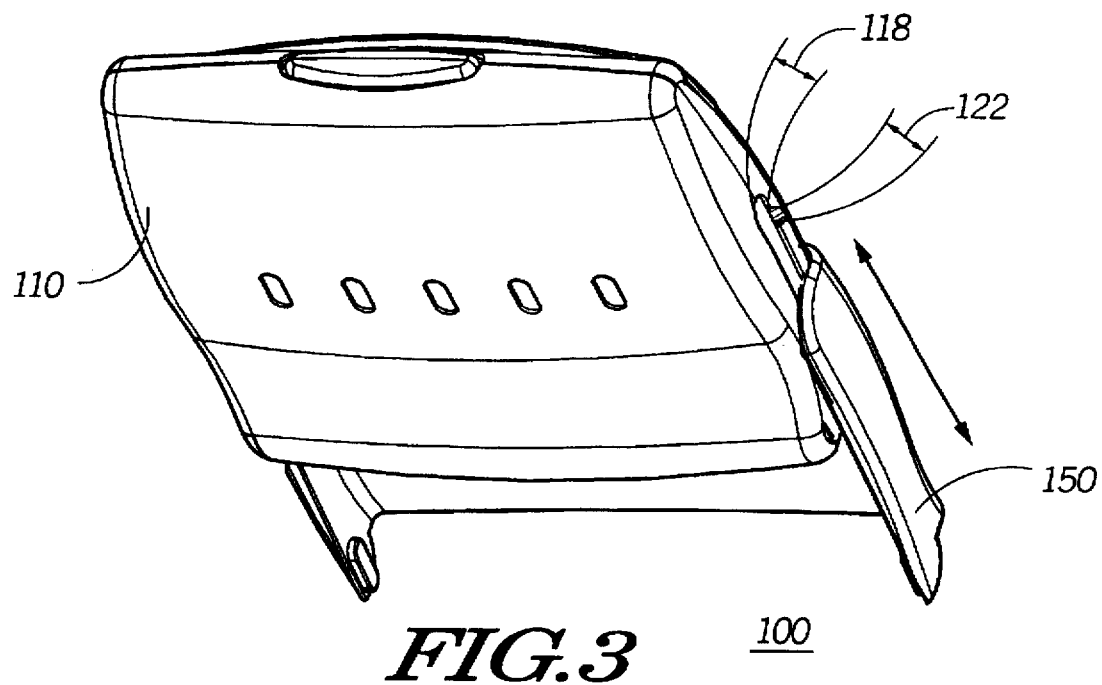
FIG. 3 is a perspective view of the selective call receiver being slidably coupled to the receptacle according to FIG. 1.

FIG. 3 is a perspective view the selective call receiver engaged in the breakaway lock and slidably coupled to the receptacle. As discussed above, in this position, the selective call receiver 110 is engaged with the breakaway lock and the non-breakaway hinge. The selective call receiver can be removed and replace from and into the receptacle 150 by sliding the selective call receiver up or down as illustrated by the vertical arrow. When the selective call receiver 110 reaches the bottom of the receptacle, it can be released from the breakaway lock and rotated into the at least first or second pivot position to enable the user to access messages or the control buttons.

Figure 4:
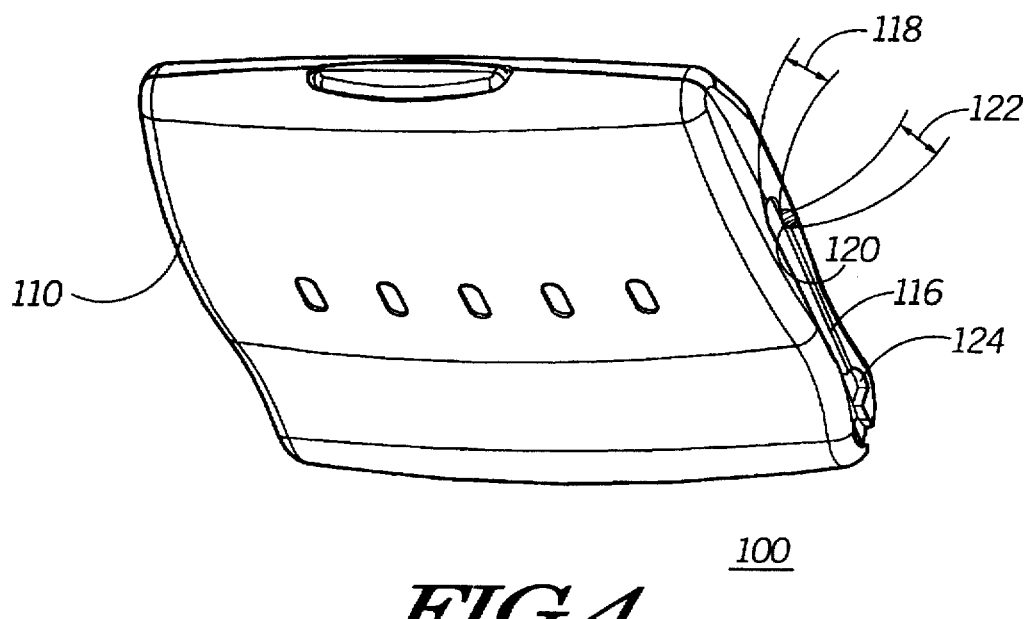
FIG. 4 is a perspective view of the selective call receiver according to FIG. 1.
Figure 5:
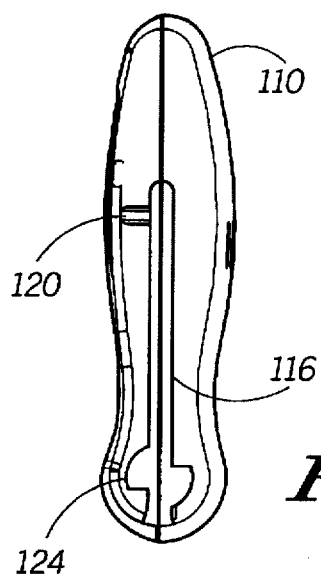
FIG. 5 is a perspective view of the receptacle according to FIG. 1.

FIG. 4 is a perspective view and FIG. 5 is a side elevation view of the selective call receiver removed from the receptacle. The selective call receiver 110 shows the track 116 with the groove 120 coupled substantially perpendicular to the track 116 on an upper end (top) of the track 116 and the geometric groove 124 that is curved sufficiently to allow the rails on the receptacle 150 to move within the geometric groove 124 when the selective call receiver 110 is being pivoted.

Figure 6:
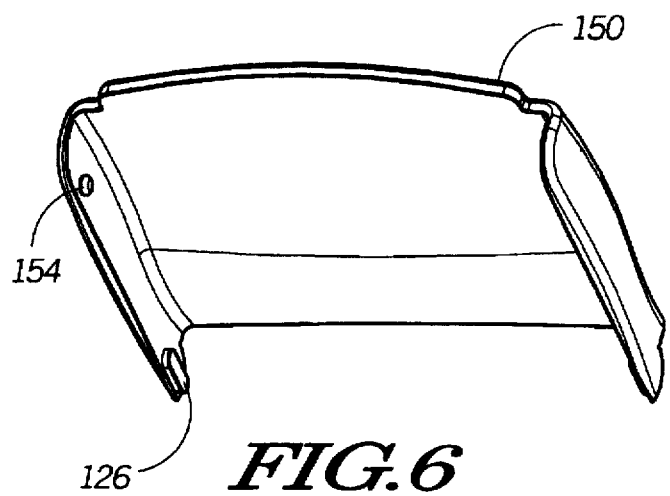
FIG. 6 is a side elevation of the selective call receiver according to FIG. 1.
Figure 7:
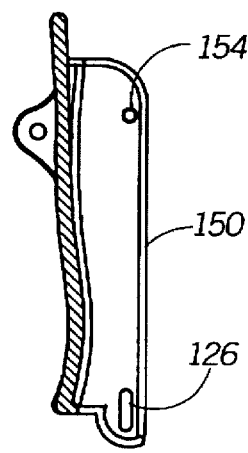
FIG. 7 is a cross sectional side view of the receptacle according to FIG. 1.

Referring to FIGS. 6 and 7, a perspective view and a cross-sectional view, respectively, of the receptacle are shown when the selective call receiver is removed. The receptacle 150 shows the tab 154 and the rail 126 for coupling with the track 116 to slide the selective call receiver 110 into the receptacle 150 and to pivot the selective call receiver 110 as discussed above.

In this way, a selective call receiver is slidably and rotatably coupled with a receptacle for carrying the selective call receiver on the body of a user. When the selective call receiver is fully inserted in the receptacle, the user is able to release the selective call at the breakaway locks and pivots the selective call receiver at the non-breakaway hinge to view messages or to operate control buttons on the selective call receiver. When the selective call receiver is released from the breakaway locks, the selective call receiver can be pivoted at the non-breakaway hinge. In the pivot position, the selective call receiver is secured in the receptacle from be dislodged or removed by the user. When the selective call receiver is engaged with the breakaway locks, only then can the selective call receiver be slidably removed from the receptacle.

In summary, a selective call receiver has a display and a receptacle in combination. The combination comprises a clip for securing the receptacle to a user, a breakaway lock, a non-breakaway hinge, a track having a first depth 118 and a slidably coupling having the breakaway lock and the non-breakaway hinge coupled at substantially opposite ends of the back for slidably removing and slidably replacing the selective call receiver from the receptacle. The breakaway lock comprises a tab and a groove with a second depth 122 less than the first depth 118 for disengaging the selective call receiver from the receptacle at the breakaway lock. The groove is coupled substantially perpendicular to the track to permit a perpendicular force to disengage the selective call receiver at the breakaway lock. The non-breakaway hinge forms a rotatable coupling for pivoting the selective call receiver within the receptacle. The non-breakaway hinge comprises a rail and a geometric groove terminating the track. The rail and the geometric groove allow the selective call receiver to be pivoted at the non-breakaway hinge when the breakaway lock is disengaged while securing the selective call receiver within the receptacle when the selective call receiver is pivoted. The receptacle releases the selective call receiver to be slidably removed when the breakaway lock is engaged with the selective call receiver.

As can be seen, a specific embodiment of the present invention has been shown and described. Further modifications and improvements will occur to those skilled in the art without departing from the scope and spirit of the invention disclosed herein.

What is claimed is:

1. A communication device having a display and a receptacle, comprising in combination:

a clip for searing the receptacle to a user;

a breakaway lock;

a non-breakaway hinge;

a track having a first depth; and a slidably coupling comprising the breakaway lock and the non-breakaway hinge coupled with the track for removing and replacing the communication device from the receptacle;

the breakaway lock comprising:
   a tab; and
   a groove having a second depth less than the first depth for disengaging the communication device from the receptacle at the breakaway lock;
the non-breakaway hinge forms a rotatable coupling for pivoting the communication device within the receptacle, the non-breakaway hinge, comprising:
   a rail; and
   a geometric groove terminating the track;
wherein the rail and the geometric groove allow the communication device to be pivoted at the non-breakaway hinge when the breakaway lock is disengaged while securing the communication device within the receptacle when the communication device is being pivoted and releasing the communication device to be slidably removed when the breakaway lock is engaged with the communication device.

2. The combination according to claim 1 wherein the groove of the breakaway lock is coupled substantially perpendicular to the track on the communication device to permit a perpendicular force to disengage the communication device at the breakaway lock.

3. The combination according to claim 1 wherein a first breakaway lock is oppositely located to a second breakaway lock and a first non-breakaway hinge is oppositely located to a second non-breakaway hinge.

4. The combination according to claim 3 wherein the first breakaway lock and the first non-breakaway hinge are coupled at substantially opposite ends of a first track and the second breakaway lock and the second non-breakaway hinge are coupled at substantially opposite ends of a second track.

5. A communication device and a receptacle, wherein the communication device, comprising:
   a first track and a second track;
   the receptacle, comprising:
      a first tab and a second tab; and
      a first rail and a second rail;
   wherein the first tab and the first rail slidably couple with the first track and the second tab and the second rail slidably couple with the second track;
   the first track and the second track having a first depth and terminating in a first geometric groove and a second geometric groove respectively;
   wherein a first breakaway lock is formed with a first groove having a second depth less that the first depth being coupled to the first track and engaging the first tab;
   wherein a second breakaway lock is formed with a second groove having the second depth being coupled to the second track and engaging the second tab; and
   wherein a first non-breakaway hinge is formed with the first rail coupling with the first geometric groove and a second non-breakaway hinge is formed with the second rail coupling with the second geometric groove, the first and second non-breakaway hinges enabling the communication device to pivot when the first and second breakaway locks are disengaged while securing the communication device within the receptacle when the communication device is being pivoted and releasing the communication device to be slidably removed when the first and second breakaway locks are engaged.

6. The communication device and the receptacle according to claim 5 wherein the first and second grooves of the first and second breakaway locks are coupled substantially perpendicular to the first and second tracks respectively to permit a perpendicular force to disengage the communication device at the first and second breakaway locks.

7. The communication device and the receptacle according to claim 5 wherein the first breakaway lock is oppositely located to the second breakaway lock and the first non-breakaway hinge is oppositely located to the second non-breakaway hinge.

8. The communication device and the receptacle according to claim 5 wherein the first breakaway lock and the first non-breakaway hinge are coupled at substantially opposite ends of the first track and the second breakaway lock and the second non-breakaway hinge are coupled at substantially opposite ends of the second track.

9. A selective call receiver having a display and a receptacle, comprising in combination:
   a clip for securing the receptacle to a user;
   a breakaway lock;
   a non-breakaway hinge;
   a track having a first depth; and
   a slidably coupling comprising the breakaway lock and the non-breakaway hinge coupled at substantially opposite ends of the track for slidably removing and slidably replacing the selective call receiver from the receptacle;
   the breakaway lock comprising:
      a tab; and
      a groove having a second depth less than the first depth for disengaging the selective call receiver from the receptacle at the breakaway lock, the groove being coupled substantially perpendicular to the track to permit a perpendicular force to disengage the selective call receiver at the breakaway lock;
   the non-breakaway hinge forms a rotatable coupling for pivoting the selective call receiver within the receptacle, the non-breakaway hinge, comprising:
      a rail; and
      a geometric groove terminating the track;
   wherein the rail and the geometric groove allow the selective call receiver to be pivoted at the non-breakaway hinge when the breakaway lock is disengaged while securing the selective call receiver within the receptacle when the selective call receiver is being pivoted and releasing the selective call receiver to be slidably removed when the breakaway lock is engaged with the selective call receiver.

10. The combination according to claim 9 wherein a first breakaway lock is oppositely located to a second breakaway lock and a first non-breakaway hinge is oppositely located to a second non-breakaway hinge.

11. The combination according to claim 10 wherein the first breakaway lock and the first non-breakaway hinge are coupled at substantially opposite ends of a first track and the second breakaway lock and the second non-breakaway hinge are coupled at substantially opposite ends of a second track.

* * * * *

UNITED STATES PATENT AND TRADEMARK OFFICE
CERTIFICATE OF CORRECTION

PATENT NO. : 5,666,273
DATED : September 9, 1997
INVENTOR(S) : Robert Kurcbart

It is certified that error appears in the above-indentified patent and that said Letters Patent is hereby corrected as shown below:

Column 5, line 47, delete "that" and insert --than--.

Column 4, line 59, change "searing" to --securing--.

Signed and Sealed this

Twenty-sixth Day of May, 1998

Attest:

BRUCE LEHMAN

Attesting Officer

Commissioner of Patents and Trademarks